UNITED STATES PATENT OFFICE.

CHARLES GLASER, OF BALTIMORE, MARYLAND.

PROCESS OF MAKING PHOSPHATE OF ALUMINA.

SPECIFICATION forming part of Letters Patent No. 453,299, dated June 2, 1891.

Application filed November 26, 1890. Serial No. 372,705. (No specimens.)

*To all whom it may concern:*

Be it known that I, CHARLES GLASER, a citizen of the United States, residing at Baltimore, in the State of Maryland, have invented certain new and useful Improvements in a Process for Obtaining High-Grade Precipitated Phosphates from Certain Mineral Phosphates; and I do hereby declare the following to be a full, clear, and exact description of the invention, such as will enable others skilled in the art to which it appertains to make and use the same.

My invention consists of a new and useful process for the manufacture of high-grade phosphates entirely soluble in the standard solution of citrate of ammonia at 150° Fahrenheit—that being the approved test of availability for manurial purposes—out of insoluble mineral phosphates of alumina or phosphorites containing a portion of their phosphoric acid in combination with alumina.

My process is based on the following reactions: If a finely-divided phosphate of alumina (or phosphorite containing same) be digested in a sufficient solution of an alkali, with or without heat, all of the phosphate of alumina present will be dissolved with decomposition. If now the alkaline solution be treated with carbonic acid at ordinary temperatures, (or better under cooling,) the phosphate of alumina will be precipitated, and the remaining solution will contain only carbonates of the alkali, with perhaps a small remainder of phosphates of the alkali and of alumina. The precipitate will be the product of my process and will be found to meet the test of availability for fertilizing mentioned above. The remaining solution containing carbonate of alkali may be regenerated to a solution of alkali by treatment with lime, (in a manner well known to chemistry,) and so restored may be used on a new charge of the first-treated phosphate; and since the carbon dioxide may be obtained from the same apparatus in which lime is produced for regeneration it is possible to treat in this way an unlimited amount of mineral phosphate with a given amount of alkali, carbonic acid, and lime, the only losses being those of incidental wastage.

Of the chemical facts implied in the foregoing processes the following are known to me only by my own experiments, and are believed to be new in their discovery as well as in their application: first, the fact that by passing carbon dioxide through the solution of phosphate of alumina with an alkali, as described, with due precaution as to strength and concentration, a precipitate is obtained consisting mainly, if not entirely, of phosphate of alumina.

The best way known to me of carrying out my process with the special precautions to be taken will be shown in the following examples: Take a convenient amount of phosphate of alumina or mineral containing same, reduced to a finely-divided state, put into a suitable vessel, and digest with the solution of an alkali—for example, sodium hydroxide—sufficient to insure complete decomposition and solution of the phosphate. This is promoted by heat. Instead of digesting, it may be advantageous to digest and leach the phosphate or mineral by several successive applications of the alkaline solution, arriving at the same result—viz., a saturated solution. Care should be taken to use not less than one hundred and sixty-five parts of sodium hydrate to one hundred parts of phosphate of alumina, though an excess may be found advantageous. Again, care must be taken to use the solution of the alkali in such a degree of concentration as to avoid, on the one hand, solidification of sodium aluminate and sodium phosphate upon cooling, and on the other precipitation of alumina hydrate under the subsequent treatment with carbon dioxide. The former will happen if the solution is too concentrated, the latter if it is too dilute. The degree recommended in the instance proposed is a solution containing between five and fifteen per cent. of sodium hydrate. In presence of phosphoric acid, alumina is apparently not precipitated purely as hydrate; but so far as my knowledge goes the precipitate always contains phosphoric acid. It is only a question of degree and of practical value, as it is the purpose to produce a high-grade phosphate of alumina containing as little aluminum hydroxide as possible. This purpose is attained by observing the directions about concentration.

Having formed the solution, separate it from the insoluble residue. This, in the case of phosphate of alumina, will consist chiefly of silicates and impurities, but in the case of phosphorites will contain other phosphates, as phosphate of lime, and these being valuable will be preserved for other uses. The solution, containing, it is supposed, aluminate and phosphate of sodium, with perhaps a little free alkali, is now saturated with carbonic acid, either by addition of a bicarbonate or by introducing carbonic-acid gas. For the best results the solution should be cold at this stage, as it will be found that the hot solution of a carbonate of an alkali will retain much phosphate of alumina in solution. The precautions indicated having been observed, the greatest part of the alumina and phosphoric acid will now be precipitated as phosphate of alumina, and may be separated from the liquid by decantation, filtration, or otherwise.

I recommend the use of filtering-presses for this, both to allow complete washing and recovery of the carbonate, and also to obtain the precipitated phosphate in convenient form to handle and dry; and in drying it I prefer a low degree of heat, (not much exceeding 212° Fahrenheit,) as a higher degree is apt to impair its solubility. The filtrate containing carbonate may be now regenerated by boiling with lime or its equivalent in a manner known to chemistry, and then used as an alkaline solution for a repetition of the foregoing process.

What I claim is—

The process of manufacturing high-grade precipitated phosphate of alumina from insoluble phosphates of alumina or minerals containing same by first digesting (or leaching) the mineral with the solution of an alkali, so as to dissolve the phosphate of alumina, next separating the solution so formed from the residue, next treating this separated solution with carbonic acid, so as to cause precipitation of phosphate of alumina, next separating this precipitate from the liquid and drying same, it being the product of the process, and finally regenerating the remaining liquid from the solution of a carbonate to the solution of an alkali for a repetition of the process, all substantially as described.

In testimony whereof I affix my signature in presence of two witnesses.

CHARLES GLASER.

Witnesses:
I. W. MOHLER, Jr.,
L. K. SPARROW.